Oct. 7, 1941.    K. MILLER    2,258,296

CLUTCH

Filed Sept. 28, 1940

Inventor:
Kay Miller
By Manna, Wintercorn & Morsbach
Attys.

Patented Oct. 7, 1941

2,258,296

UNITED STATES PATENT OFFICE 2,258,296

CLUTCH

Kay Miller, Rockford, Ill., assignor to The Atwood Vacuum Machine Company, Rockford, Ill., a copartnership composed of Seth B. Atwood and James T. Atwood Application September 28, 1940, Serial No. 358,797

15 Claims. (Cl. 192—99)

This invention relates to friction clutches generally, but is particularly concerned with an improved over-center type of clutch especially designed for tractors and suitable, of course, for other heavy duty purposes. A clutch of that type is disclosed in the copending application of myself and W. Vincent Thelander, Serial No. 194,337, filed March 7, 1938.

One of the principal difficulties to contend with in over-center clutches has been the high unit bearing pressures and the heavy force required to move the over-center engaging means over center. Efforts have been made to substitute rolling action for sliding action between the relatively movable parts to make for easier engagement and disengagement of the clutch, but so far as I am aware no practical solutions to the problem have appeared. The limited space between the back plate and pressure plate also adds to the difficulty, and cost considerations also enter in to a considerable extent. It is, therefore, the principal object of my invention to provide an improved anti-friction type over-center engaging means of a form compact enough to fit into the clutch between the pressure plate and back plate without other alteration of the clutch construction, the anti-friction combination being moreover of a simple and relatively inexpensive construction.

The anti-friction combination, in accordance with my invention, comprises a set of three compound rollers carried on the end of the actuating lever in inter-engaging relationship with the first of the rollers forming a fulcrum for the lever, the second rolling on it, and the third rolling on the second and arranged to have rolling engagement on an abutment plate in fixed relation to the back plate, the three rollers being so proportioned that sliding friction is substantially entirely eliminated and rolling friction substituted in the oscillatory movement of the actuating lever for engagement and disengagement of the clutch.

The invention in its broader aspects contemplates a new mechanical movement and an anti-friction toggle lever for general application.

The invention is illustrated in the accompanying drawing, in which—

The same reference numerals are applied to corresponding parts in the four views.

Figure 1:
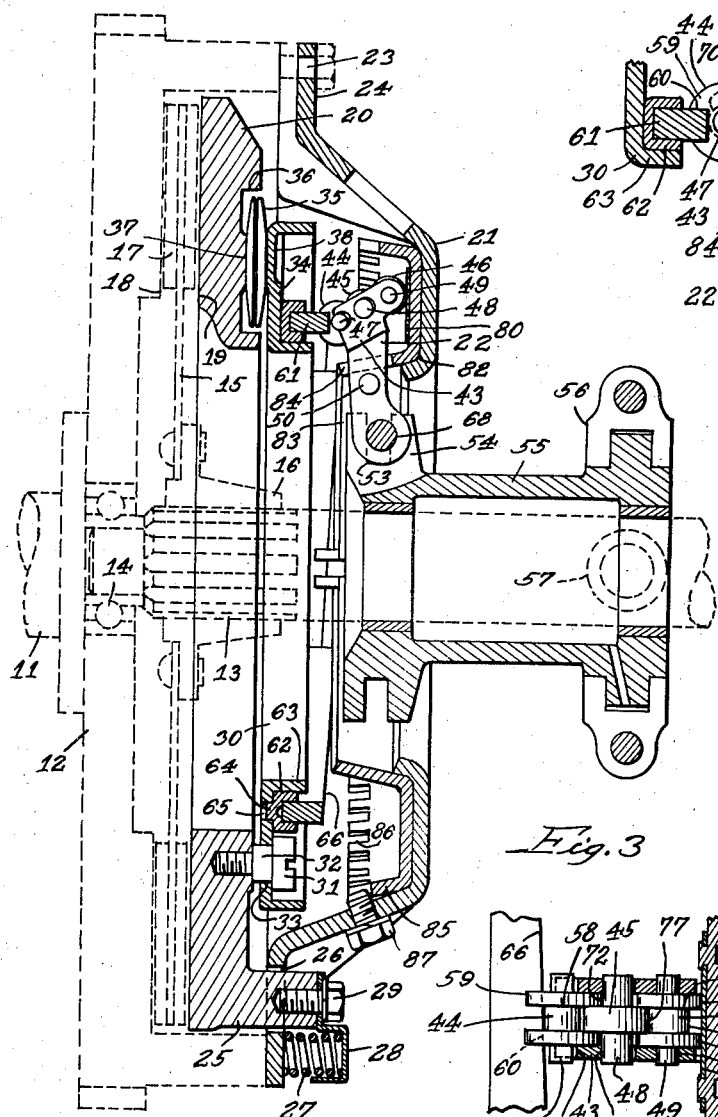
Figure 1 is a longitudinal section through a clutch made in accordance with my invention.

Referring first to Figure 1, in which a clutch similar to that disclosed in the copending application previously mentioned is shown, the end portion of the crankshaft of the engine is indicated in dotted lines at 11 and the flywheel at 12. 13 is the driven shaft extending rearwardly from the flywheel and clutch into the gear box of the transmission, in the usual way. It has the usual pilot bearing 14 supporting the front end thereof at the center of the flywheel 12. 15 is the clutch disk the center hub 16 of which is splined on the front end of the shaft 13 to transmit drive from the flywheel to the shaft when the clutch is engaged. The usual pads or facings 17 on the clutch disk are adapted for engagement with the driving face 18 on the back of the flywheel and the companion driving face 19 on the front of the pressure plate 20. The latter is suitably cast like the flywheel, and the faces 18 and 19 are accurately machined on these cast parts to insure smooth clutch engagement. The back plate 21 is stamped from sheet metal to the dished form shown, so as to provide enough space between it and the pressure plate 20 for the bell-crank type actuating levers 22 which constitute the over-center engaging means of the clutch. The back plate is suitably secured to the rim of the flywheel by bolts entered through holes 23 in the flanged marginal portion 24 of the back plate. A plurality of equally circumferentially spaced lugs 25 cast integral with the pressure plate 20 project rearwardly therefrom, and these lugs have the side faces thereof machined smooth to slide freely on the sides of the holes 26 provided in the back plate. In that way, the pressure plate turns with the flywheel, but is movable toward and away from the driving face 18 for engagement and disengagement of the clutch. Springs 27 are held compressed under sheet metal clips 28 fastened onto the ends of the lugs 25 by screws 29 and serve to urge the pressure plate toward the back plate, whereby to insure immediate disengagement of the clutch when the actuating levers 22 are moved to the position shown in Fig. 1, for disengagement of the clutch.

The pressure plate 20 carries a sheet metal ring 30 of generally channel-shaped cross-section on the back thereof on screws 31 which have smooth cylindrical shanks 32 fitting freely in holes 33 provided in equally circumferentially spaced relation in the web portion 34 of the ring. A plurality of stacked spring washer assemblies, indicated generally by the numeral 35, are held compressed between the pressure plate 20 and ring 30, so as to provide what is called a preloaded spring means for resiliently engaging the clutch, the term "preloaded" signifying that upon engagement of the clutch said spring means is subjected to further compression, and it is this increased spring pressure that is effective on the pressure plate holding the clutch disk 15 engaged between the flywheel and pressure plate. The stacked spring washer assemblies 35, of which there are preferably eight are arranged all on the same radius and in equally circumferentially spaced relation. The pressure plate has circular depressions 36 cored in the back face thereof to receive the same, with ample working clearance left around the peripheries of the washers. Flat raised seats 37 are provided on the pressure plate in the centers of these depressions 36 for the spring washer assemblies 35, and the ring 30 has portions of the web 34 thereof struck outwardly to provide raised seats 38 in register with the seats 37 for engagement with the opposite side of the spring washer assemblies 35 at the centers thereof. Each of the spring washer assemblies 35, as disclosed in the copending application, provides an initial or "preload" spring pressure of say 130 lbs., and in the engagement of the clutch the washers are compressed further to exert about 260 lbs. pressure, .060" travel being required to change from the preload pressure to the engagement pressure, so that a few thousandths of an inch wear on the clutch disk facings 17 will not be noticeable and cannot seriously affect the operation of the clutch. A take-up adjustment to compensate for wear is also provided, as hereinafter described, and adjustment with the present construction does not have to be nearly as close as in the ordinary springless type of over-center clutch, because a deviation of a few thousandths of an inch adjustment one way or the other from the desired point will not seriously affect the operation of the clutch. The objective in making an adjustment, however, is to advance the pressure plate assembly in relation to the engaging means an amount approximately the equivalent of the amount of wear on the facings so that one may obtain again the original engaging pressure, regardless of the wear.

Figure 2:
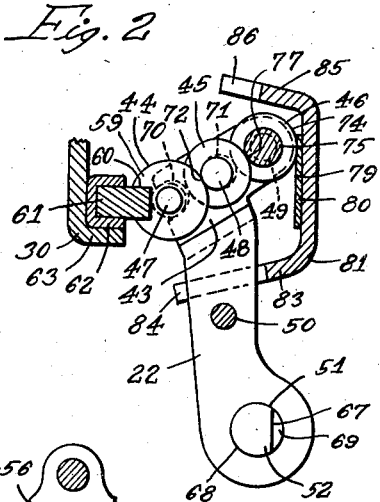
Fig. 2 is a fragmentary sectional detail on an enlarged scale with one-half of the lever removed and portions of the rollers cut away to better illustrate the compound roller combination in the actuating lever.
Figure 3:
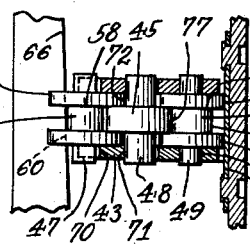
Fig. 3 is a section in a plane at right angles to Fig. 2, looking at the end of the lever with the side walls of the lever shown in section to better illustrate the inter-engagement of the rollers.
Figure 4:
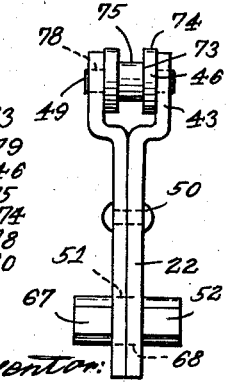
Fig. 4 is a rear view of the actuating lever by itself.

The actuating levers 22 are of two-piece stamped sheet metal construction, as clearly appears in Figs. 2 and 4, the pieces being bent so as to provide a forked end 43 to mount the three compound rollers 44, 45, and 46 therein by means of their trunnions, numbered 47, 48, and 49 respectively. The lever pieces are riveted together at the middle, as indicated at 50, a single rivet being sufficient. A bearing hole 51 is provided in the other end of the lever 22 remote from the rollers to receive a pin 52 adapted to work in the slots 53 in the forked portion 54 on the throw-out collar 55. The latter is operable back and forth by a two-piece ring 56 fitting over a flange on the collar and provided with trunnions 57 for cooperation with the usual yoke or other clutch operating means. The roller 44 is annularly grooved, as clearly appears at 58, so as to define spaced concentric flanges 59 between the trunnions 47. The roller is slotted lengthwise on one side, as indicated at 60, so that the flanges 59 can straddle the peripheral portion of an arcuate cam 61 carried in a sheet metal ring 62 of channel-shaped cross-section mounted on the ring 30 on the pressure plate 20. The ring 62 is pressed into place over the inner flange 63 of the ring 30 and it has a small cylindrical boss 64 struck therefrom at one point to enter a hole 65 in the web 34 of the ring so as to eliminate any likelihood of the ring 62 turning with respect to the pressure plate and changing the clutch take-up adjustment. As disclosed in the copending application, there are four of these arcuate cams 61, one for each of four actuating levers 22, and these cams are formed from straight strips stamped from sheet metal and subsequently formed to the desired arcuate shape. The inclined surface 66 on each cam provides the desired helical cam surface, which when the rollers 44 that form the fulcrums for the levers 22 are slid along the cams 61 serve to change the relationship between the levers 22 and the spring means 35 and pressure plate 20 to compensate for wear on the clutch disk facings 17. The cams 61 are adapted to be entered with a press fit in the channel of the ring 62. The pin 52 is machined flat on one side at both ends in the same plane, as indicated at 67, whereby to fit slidably and non-rotatably in the slots 53 while still providing the intermediate cylindrical bearing portion 68 to fit in the bearing hole 51 on the lever 22, but present shoulders 69 for engagement with the sides of the forked portion 54 on the throwout collar 55 and thus keep the pin from drifting endwise from its assembled position.

The rollers 44, it should be clear, is non-rotatably but slidably mounted on the cam 61 to serve as a fulcrum for the lever 22. The trunnions 47 and the roller 44 enter notches 70 in the forked portion 43 of the lever. The next roller 45 fits in the groove 58 of the roller 44 and has working clearance between the flanges 59. The trunnions 48 which extend through holes 71 in the forked portion 43 of the lever have rolling engagement on the periphery of the flanges 59, as indicated at 72. The other roller 46 is annularly grooved like the roller 44, as indicated at 73, to provide parallel concentric flanges 74 between the trunnions 49 and on opposite sides of a central axle portion 75 arranged to roll on the periphery of the roller 45, as indicated at 77. The trunnions 49 extend through holes 78 in the forked portion 43 of the lever 22. The flanges 74 are arranged to roll on the flat face 79 of a hardened steel plate 80 riveted or otherwise suitably secured to a sheet metal ring 81 of channel-shaped cross-section slidable in an annular seat 82 provided therefor in the dished portion of the back plate 21. The ring 81 has its inner flange 83 slotted, as at 84, at four points in equally circumferentially spaced relation to receive and guide four levers 22. The outer flange 85 has the edge thereof notched, as at 86, to receive the end of a set screw 87 threaded in the back plate 21, in any one of these notches, when the ring 81 is turned in the take-up adjustment. Manifestly the turning of the ring 81 results in the movement of the levers 22 with it so that the rollers 44 forming fulcrums for the levers are slid along the cams 61 for the take-up adjustment previously described. The notches 86 are closely spaced so that a rather fine adjustment is permitted.

In operation, when the levers 22 are moved in a clockwise direction about the rollers 44 as fulcrums, the rollers 45 and 46 cooperating with the roller 44 in each of the levers 22 give the desired anti-friction rolling operation. The roller 46 rolls on the surface 79 of the ring 80 by means of its flanges 74, while the axle portion 75 of the roller rolls on the periphery of the roller 45 for the first stage of necessary reduction. The trunnions 48 of the roller 45 roll on the periphery of the flanges 59 of the roller 44 for the second stage of necessary reduction. The compound rollers 44—46 are so proportioned that there is substantially no sliding friction at the points 72 and 77. Furthermore all of the rollers are of large enough diameters so that none of the rollers makes more than a small fraction of a turn in the movement from one extreme position to the other and wear upon the parts is accordingly reduced to a minimum. The load is so well distributed between the compound rollers at the points 72, 77, and 79 that the unit bearing pressure is reduced to a very small fraction of what was obtained with other constructions, thus further reducing wear and making for easier operation. The roller trunnions 47, 48, and 49 have sufficiently ample working clearance in the notches 70 and holes 71 and 78 so that there is no tendency to bind, the rollers being therefore free to adjust themselves in relation to the lever 22 to have proper bearing engagement upon one another and transmit load from one to the other through the train of three rollers substantially independently of the lever, the lever merely acting as a retaining cage for the rollers.

It should be clear from this description that I have provided an unusually practical and efficient design of over-center clutch, and one which may be manufactured at low cost and is adapted to be adjusted by relatively unskilled workmen without difficulty.

It is believed the foregoing description conveys a good understanding of the objects and advantages of my invention. The appended claims have been drawn to cover all legitimate modifications and adaptations.

I claim:

1. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch comprising one or more bell-crank levers, a fulcrum for each of said levers on the pressure plate, a roller rotatably mounted on each of said levers rollingly engaging an abutment on the back plate, and at least one intermediate roller rotatably mounted on each of said levers having rolling engagement on the one hand with the fulcrums and on the other hand with the last-mentioned rollers to transmit through such rolling engagement the load from the first-mentioned rollers to the fulcrums substantially independently of the levers.

2. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch comprising one or more bell-crank levers, a fulcrum for each of said levers on the pressure plate, a compound roller rotatably mounted on each of said levers having rolling engagement on one diameter with an abutment on the back plate, and at least one other compound roller rotatably mounted on each of said levers between the fulcrums and the first-mentioned rollers having rolling engagement on one diameter with the first-mentioned rollers and on another diameter with the fulcrums to transmit through such rolling engagement the load from the first-mentioned rollers to the fulcrums substantially independent of the levers.

3. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch comprising one or more bell-crank levers, a fulcrum for each of said levers on one of said plates, a roller rotatably mounted on each of said levers rollingly engaging an abutment on the other of said plates, and at least one intermediate roller rotatably mounted on each of said levers having rolling engagement on the one hand with the fulcrums and on the other hand with the last-mentioned rollers to transmit through such rolling engagement the load from the first-mentioned rollers to the fulcrums substantially independently of the levers.

4. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch comprising one or more bell-crank levers, a fulcrum for each of said levers on one of said plates, a compound roller rotatably mounted on each of said levers having rolling engagement on one diameter with an abutment on the back plate, and at least one other compound roller rotatably mounted on each of said levers between the fulcrums and the first-mentioned rollers having rolling engagement on one diameter with the first-mentioned rollers and on another diameter with the fulcrums to transmit through such rolling engagement the load from the first-mentioned rollers to the fulcrums substantially independently of the levers.

5. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action over-center means for moving the pressure plate away from the back plate to engage the clutch comprising one or more bell-crank levers, a compound roller with respect to which each of said levers is fulcrumed on the pressure plate, a second compound roller rotatably mounted on each of said levers and rollingly engaging an abutment on the back plate on the large diameter, and at least one intermediate compound roller on each of said levers between the first and second compound rollers rollingly engaging the large diameter of the fulcrum roller on the small diameter of the intermediate roller and rollingly engaging the small diameter of the second compound roller on the large diameter of the intermediate roller to transmit through such rolling engagement the load from the second-mentioned compound rollers to the fulcrum rollers substantially independently of the levers.

6. In a friction clutch, the combination with a flywheel constituting the driving element and a clutch disk constituting the driven element of a back plate in fixed axially spaced relation to the flywheel, a pressure plate turning with the back plate and movable toward and away from the same in the disengagement and engagement of the clutch, respectively, and positive action overcenter means for moving the pressure plate away from the back plate to engage the clutch comprising one or more bell-crank levers, a compound roller with respect to which each of said levers is fulcrumed on one of said plates, a second compound roller rotatably mounted on each of said levers and rollingly engaging an abutment on the other of said plates on the large diameter, and at least one intermediate compound roller on each of said levers between the first and second compound rollers rollingly engaging the large diameter of the fulcrum roller on the small diameter of the intermediate roller and rollingly engaging the small diameter of the second compound roller on the large diameter of the intermediate roller, to transmit through such rolling engagement the load from the second-mentioned compound rollers to the fulcrum rollers substantially independently of the levers.

7. As an article of manufacture, an actuating lever for an over-center clutch comprising a bell-crank lever and three compound rollers rotatably mounted in inter-engaging relationship on one of the arms of said levers, each roller having two diameters, one larger than the other, the first of said rollers having the large diameter portion thereof projecting from said lever for engagement with a bearing surface in the clutch, the second of said rollers having its large diameter portion rollingly engaging the small diameter portion of the first roller, the second roller having the small diameter thereof rollingly engaging the large diameter portion of the third compound roller, and the third compound roller being adapted to pivotally support the lever on another clutch part movable toward and away from the first clutch part.

8. An article of manufacture as set forth in claim 7, wherein the lever is made in two parts providing spaced portions between which the rollers are rotatably mounted, each of the rollers having axial trunnions received in holes provided therefor in said spaced portions.

9. An article of manufacture as set forth in claim 7, wherein the lever is made in two parts providing spaced portions between which the rollers are rotatably mounted, each of the rollers having axial trunnions received in holes provided therefor in said spaced portions, the intermediate roller having the trunnions thereof of the same diameter as the small diameter portion thereof rollingly engaging the large diameter of the third roller.

10. As a new mechanical movement, the combination with two members arranged to be moved with respect to one another, of a bell-crank lever pivoted on one of said members and arranged by engagement with the other of said members to cause movement of one of said members relative to the other, a fulcrum for said lever on the first member, a roller rotatably mounted on the lever rollingly engaging an abutment on the other member, and at least one intermediate roller rotatably mounted on said lever having rolling engagement on the one hand with the fulcrum and on the other hand with the last-mentioned roller to transmit through such rolling engagement the load from the first-mentioned roller to the fulcrum substantially independently of the lever.

11. As a new mechanical movement, the combination with two members arranged to be moved with respect to one another, of a bell-crank lever pivoted on one of said members and arranged by engagement with the other of said members to cause movement of one of said members relative to the other, a fulcrum for said lever on the first member, a compound roller rotatably mounted on said lever having rolling engagement on one diameter with an abutment on the other member, and at least one other compound roller rotatably mounted on the lever between the fulcrum and the first roller having rolling engagement on one diameter with the first-mentioned roller and on another diameter with the fulcrum to transmit through such rolling engagement the load from the first-mentioned roller to the fulcrum substantially independently of the lever.

12. As a new mechanical movement, the combination with two members arranged to be moved with respect to one another, of a bell-crank lever pivoted on one of said members and arranged by engagement with the other of said members to cause movement of one of said members relative to the other, a compound roller with respect to which said lever is fulcrumed on the first member, a second compound roller rotatably mounted on said lever and rollingly engaging an abutment on the other member on the large diameter, and at least one intermediate compound roller on said lever between the first and second compound rollers rollingly engaging the larger diameter of the fulcrum roller on the small diameter of the intermediate roller and rollingly engaging the small diameter of the second compound roller on the large diameter of the intermediate roller to transmit through such rolling engagement the load from the second-mentioned compound roller to the fulcrum roller substantially independently of the lever.

13. As an article of manufacture, an anti-friction toggle lever comprising a bell-crank lever and three compound rollers rotatably mounted in inter-engaging relationship on one of the arms of said levers, each roller having two diameters, one larger than the other, the first of said rollers having the large diameter portion thereof projecting from said lever for engagement with a bearing surface on one of two spaced parts, the second of said rollers having its large diameter portion rollingly engaging the small diameter portion of the first roller, the second roller having the small diameter portion thereof rollingly engaging the large diameter portion of the third compound roller, and the third compound roller being adapted to pivotally support the lever on the other part movable toward and away from the first part.

14. An article of manufacture as set forth in claim 13, wherein the lever is made in two parts providing spaced portions between which the rollers are rotatably mounted, each of the rollers having axial trunnions received in holes provided therefor in said spaced portions.

15. An article of manufacture as set forth in claim 13, wherein the lever is made in two parts providing spaced portions between which the rollers are rotatably mounted, each of the rollers having axial trunnions received in holes provided therefor in said spaced portions, the intermediate roller having the trunnions thereof of the same diameter as the small diameter portion thereof rollingly engaging the large diameter of the third roller.

KAY MILLER.